US012802957B2

(12) United States Patent
Okamura et al.

(10) Patent No.: US 12,802,957 B2

(45) Date of Patent: Nov. 17, 2026

(54) MASS SPECTROMETER

(71) Applicant: SHIMADZU CORPORATION, Kyoto (JP)

(72) Inventors: Shinichiro Okamura, Kyoto (JP); Masaru Nishiguchi, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 576 days.

(21) Appl. No.: 18/203,356

(22) Filed: May 30, 2023

(65) Prior Publication Data

US 2024/0079224 A1 Mar. 7, 2024

(30) Foreign Application Priority Data

Sep. 5, 2022 (JP) ................................ 2022-140520

(51) Int. Cl.
*H01J 49/06* (2006.01)
*H01J 49/00* (2006.01)
*H01J 49/42* (2006.01)

(52) U.S. Cl.
CPC .......... *H01J 49/063* (2013.01); *H01J 49/005* (2013.01); *H01J 49/4215* (2013.01)

(58) Field of Classification Search
CPC ..... H01J 49/063; H01J 49/005; H01J 49/4215
See application file for complete search history.

(56) References Cited

U.S. PATENT DOCUMENTS

2007/0164213 A1 7/2007 Javahery et al.
2015/0102215 A1* 4/2015 Jung .................... H01J 49/063 250/282
2017/0263429 A1 9/2017 Dominguez et al.
2019/0189417 A1 6/2019 Gamble et al.
2022/0293408 A1 9/2022 Nishiguchi

FOREIGN PATENT DOCUMENTS

JP 2009-523300 A 6/2009
JP 2017-537439 A 12/2017
JP 2020-535622 A 12/2020
WO WO-2020129199 A1 * 6/2020 ........... H01J 49/063

OTHER PUBLICATIONS

Communication dated Mar. 17, 2026, issued in Japanese Application No. 2022-140520.
Communication dated Jul. 7, 2026, in Japanese Application No. 2022-140520.

* cited by examiner

*Primary Examiner* — Georgia Y Epps
*Assistant Examiner* — Hanway Chang
(74) *Attorney, Agent, or Firm* — Sughrue Mion, PLLC

(57) ABSTRACT

An ion transport optical system includes N rod electrodes forming an N-pole arrangement externally tangent to a circle of diameter A1 at an ion-entrance end, where N is an even number not smaller than six. Four electrodes form a quadrupole arrangement externally tangent to a circle of diameter A2 at an ion-exit end, where A2<A1. At least two of them are arranged obliquely to the central axis of the N-pole or quadrupole arrangement. At least four of the N electrodes are shaped such that the cross-sectional radius of their arc-shaped portion facing the central axis at the ion-exit end is smaller than that at the ion-entrance end. A voltage generator applies a DC voltage to the four electrodes and another DC voltage, which differs from the first one, to the N−4 remaining electrodes, in addition to RF voltages of opposite phases alternately applied to the N electrodes.

4 Claims, 7 Drawing Sheets

MASS SPECTROMETER

TECHNICAL FIELD

The present invention relates to a mass spectrometer, and more specifically, to an ion transport optical system in a mass spectrometer.

BACKGROUND ART

Mass spectrometers employ ion transport optical systems, such as ion guides or ion lenses, in order to transport ions generated in an ion source to a mass spectrometry section. The performance of an ion transport optical system significantly affects the detection sensitivity, signal stability and other performances of the mass spectrometer. For example, in a mass spectrometer which employs an electrospray ion source or other types of atmospheric pressure ion sources, the configuration of a multi-stage differential pumping system is generally adopted in which a plurality of compartments with different degree of vacuum separated from each other by a partition wall are formed between an ionization chamber which is at substantially atmospheric pressure and a high-vacuum chamber which contains a mass spectrometry section and is maintained at a high degree of vacuum. Normally, each of those compartments contains an ion transport optical system. The main function of the ion transport optical system is to receive ions sent from the previous stage and deliver those ions to the subsequent stage while confining them to a smaller area.

For an ion transport optical system designed to be located within a space having a comparatively low degree of vacuum, such as an intermediate vacuum chamber next to the ionization chamber, an RF (radio frequency) ion guide which utilizes a cooling effect through the collision of ions with a residual gas is often used. An RF ion guide transports ions while confining them to a predetermined space by means of a pseudopotential mainly generated by an RF electric field.

When ions generated in the ionization chamber are taken into the intermediate vacuum chamber having a low degree of vacuum in the next stage, the ions and other neutral particles supplied through a small hole (or capillary) in the atmospheric-pressure partition wall are introduced into the intermediate vacuum chamber by being carried by an ultrasonic gas stream formed on the exit side of that hole. Increasing the diameter of the hole so that a larger amount of ions will be taken into the next chamber will also increase the spread of the resulting ultrasonic gas stream. Therefore, the RF ion guide located within the intermediate vacuum chamber is required to efficiently collect ions which have already been, or are going to be, broadly spread by being carried by the gas stream.

A pole-number conversion ion guide disclosed in Patent Literature 1 has been known as an RF ion guide for efficiently collecting spatially spread ions on the ion-entrance side while satisfactorily converging ions on the ion-exit side. The pole-number conversion ion guide is a multi-pole RF ion guide having an even number of rod electrodes equal to or larger than six, some of which are arranged in an inclined form from the ion entrance to the ion exit so as to create a multi-pole electric field having a six or more poles on the ion-entrance side as well as a quadrupole electric field on the ion-exit side.

CITATION LIST

Patent Literature

Patent Literature 1: WO 2020/129199 A

SUMMARY OF INVENTION

Technical Problem

In order to achieve a higher level of detection sensitivity than in a conventional case, it is necessary to increase the amount of ions taken from the ionization chamber into the intermediate chamber. If the diameter of the hole in the atmospheric-pressure partition wall is increased for that purpose, the spread of the ultrasonic gas stream generated within the intermediate vacuum chamber also increases. If a pole-number conversion ion guide is used for satisfactorily collecting the ions dispersed by the spread stream of gas, it is necessary to increase the radius of the inscribed circle of the rod electrodes on the ion-entrance side. However, increasing the inscribed circle in the pole-number conversion ion guide decreases the strength of the multi-pole RF electric field within the ion incidence area, causing a decrease in the ion-collecting capability. Therefore, even when the diameter of the hole in the atmospheric-pressure partition wall is increased to introduce a larger amount of ions into the intermediate vacuum chamber, the increase in the amount of ions to be ultimately sent to the subsequent stage will be limited due to the insufficient ion-collecting capability in the ion incidence area of the ion guide.

On the other hand, in order to efficiently send ions from the intermediate vacuum chamber having a low degree of vacuum to the next intermediate vacuum chamber through the ion passage hole having a small diameter, it is desirable to increase the ion-converging effect of the quadrupole electric field in the ion-exit area of the pole-number conversion ion guide. To this end, it is preferable to decrease the interval of the rod electrodes neighboring each other in the circumferential direction at the ion-exit end. However, if the interval is too small, the resulting quadrupole RF electric field cannot have an appropriate potential distribution, and the behavior of the ions is likely to be unstable. Bringing the rod electrodes too close to each other may also cause the problem of interference between the rod electrodes in the ion-exit area, such as the occurrence of electric discharge between the electrodes.

One objective of the present invention is to provide a mass spectrometer employing a multi-pole RF ion guide which can efficiently collect ions and send them to the next stage even when the ions sent from the previous stage are considerably spread. Another objective of the present invention is to provide a mass spectrometer employing a multi-pole RF ion guide which can shape collected ions into a thin beam and efficiently send them to the next stage while avoiding interference between the neighboring rod electrodes and other related problems.

Solution to Problem

One mode of the mass spectrometer according to the present invention developed for solving the previously described problem is a mass spectrometer having an ion transport optical system configured to transport ions to be analyzed, where:

the ion transport optical system includes N rod electrodes arranged so as to extend in an ion transport direction as a whole, where N is an even number equal to or larger than six, as well as a voltage generator configured to apply a predetermined voltage to each of the N rod electrodes;

the N rod electrodes are in an N-pole arrangement at an ion-entrance end at which all of the N rod electrodes are externally tangent to a circle of diameter A1, while four of the N rod electrodes are in a quadrupole arrangement and are externally tangent to a circle of diameter A2 (where A2<A1) at an ion-exit end, with at least two rod electrodes among the four rod electrodes obliquely arranged with respect to the central axis of the N-pole or quadrupole arrangement so as to come closer to the central axis with a forward travel of the ions in the ion transport direction, and at least the four rod electrodes among the N rod electrodes have a shape in which the cross-sectional radius of an arc-shaped portion facing the central axis at the ion-exit end is smaller than the cross-sectional radius of an arc-shaped portion facing the central axis at the ion-entrance end; and the voltage generator is configured to apply, to each pair of rod electrodes neighboring each other around the central axis among the N rod electrodes, a pair of RF voltages whose phases are opposite to each other, as well as to apply a first direct voltage to the four rod electrodes and a second direct voltage, which is different from the first direct voltage, to N−4 rod electrodes other than the four rod electrodes among the N rod electrodes.

Advantageous Effects of Invention

In the previously described mode of the mass spectrometer according to the present invention, the ion transport optical system can efficiently collect ions which are incident in a considerably spreading form in the ion incidence area, then gradually decrease the spatial spread of the ions while sending them toward the rear section along the ion beam axis, and ultimately shape the ions into a thin beam and eject them to the outside by the high ion-converging effect in the ion-exit area. Consequently, as compared to the conventional pole-number conversion ion guide, an even higher level of ion transport efficiency can be realized, so that the amount of ions to be subjected to a mass spectrometric analysis can be increased, and the analysis sensitivity can be improved. Furthermore, since the radius of the rod electrodes in the ion-exit area (or the cross-sectional radius of the arc-shaped portion facing the central axis) is small as compared to the conventional pole-number conversion ion guide, interference of the rod electrodes neighboring each other in the circumferential direction is less likely to occur.

DESCRIPTION OF EMBODIMENTS

An embodiment of the mass spectrometer according to the present invention is hereinafter described with reference to the attached drawings.

It should be noted that the drawings used in the following descriptions are schematic representations and do not exactly reflect an actual device in terms of the dimension, ratio and other aspects of the individual component members. It should also be naturally understood that unnecessary components for the descriptions are appropriately omitted.

Overall Configuration of Device According to One Embodiment

Figure 1:
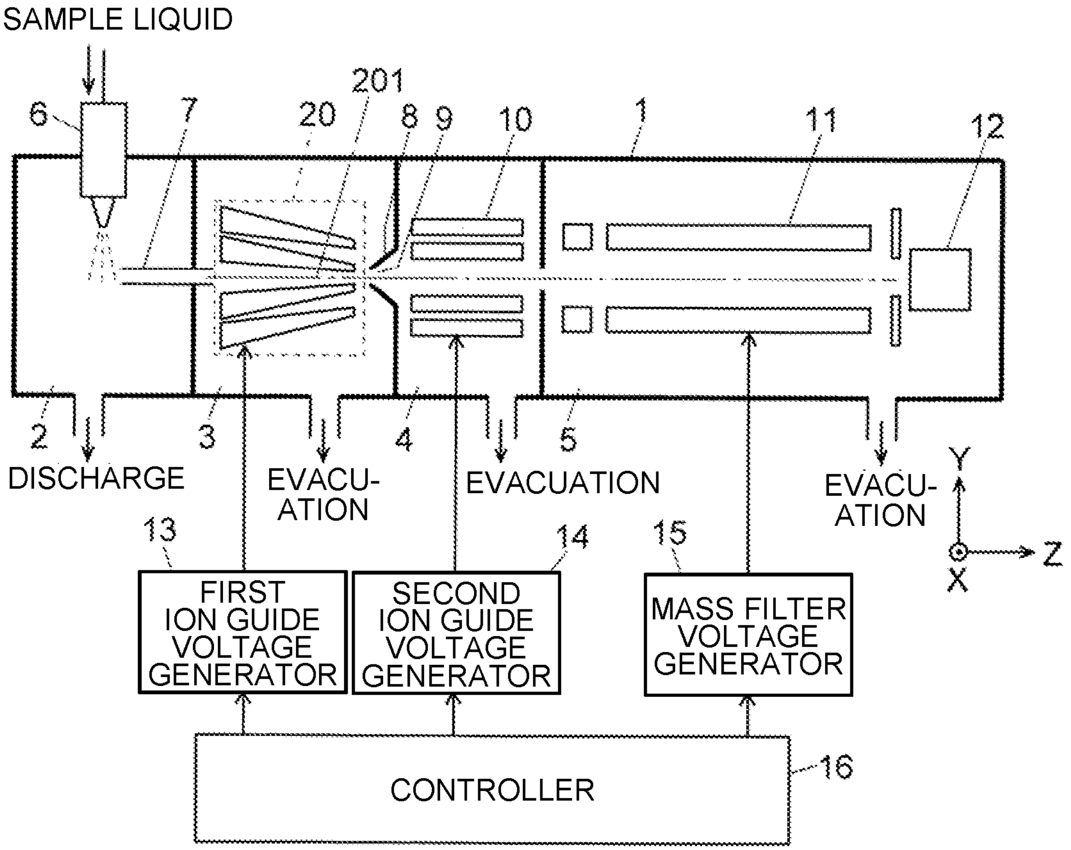
FIG. 1 is a schematic configuration diagram of a mass spectrometer as one embodiment of the present invention.

FIG. 1 is a schematic configuration diagram of the mass spectrometer according to the present embodiment. The mass spectrometer according to the present embodiment is an atmospheric pressure ionization quadrupole mass spectrometer, which has the configuration of a multi-stage differential pumping system.

A chamber 1 includes an ionization chamber 2 which is at substantially atmospheric pressure, an analysis chamber 5 maintained at a high degree of vacuum, as well as a first intermediate vacuum chamber 3 and a second intermediate vacuum chamber 4 between the two previously mentioned chambers, with the degree of vacuum increased in a stepwise manner through the two intermediate vacuum chambers. Though not shown in the drawing, the first intermediate vacuum chamber 3 is evacuated with a rotary pump, while the second intermediate vacuum chamber 4 and the analysis chamber 5 are each evacuated with a turbomolecular pump combined with a rotary pump acting as a roughing vacuum pump.

The ionization chamber 2 is provided with an ESI probe 6 for electrospray ionization. The ionization chamber 2 communicates with the first intermediate vacuum chamber 3 through a thin desolvation tube 7. The first intermediate vacuum chamber 3 contains a first ion guide 20. A predetermined voltage is applied from a first ion guide voltage generator 13 to the first ion guide 20. The first intermediate vacuum chamber 3 communicates with the second intermediate vacuum chamber 4 through an ion passage hole 9 having a small diameter formed at the apex of a skimmer 8.

The second intermediate vacuum chamber 4 contains a second ion guide 10, to which a predetermined voltage is applied from a second ion guide voltage generator 14. The analysis chamber 5 contains a quadrupole mass filter 11 and an ion detector 12. A predetermined voltage is applied from a mass filter voltage generator 15 to the quadrupole mass filter 11. The voltages generated in the first ion guide voltage generator 13, second ion guide voltage generator 14, and mass filter voltage generator 15 are individually controlled by a controller 16.

In order to facilitate the understanding of the arrangement and positional relationship of the components arranged within the chamber 1, the three axes of X, Y and Z orthogonal to each other are defined as shown in FIG. 1. The Z axis is an axis indicating the direction of an ion beam axis 201 over the almost entire length of the ion path. The X and Y axes are two axes orthogonal to each other as well as to the Z axis. For convenience of description, it is assumed that the Y-axis direction indicates the vertical direction of the device, although the X, Y and Z axes do not always need to represent specific directions for the device, such as the upper, lower, right or left side of the device. Therefore, although the ESI probe 6 in the mass spectrometer according to the present embodiment is configured to spray a sample liquid downwards, this configuration is a mere example and can be appropriately changed.

[Mass Spectrometric Operation]

A typical analysis operation in the mass spectrometer according to the present embodiment is as follows:

A sample liquid containing a target component is supplied to the ESI probe 6. The sample liquid is sprayed from the tip of the ESI probe 6 into the ambience of substantially atmospheric pressure while being given imbalanced electric charges. The sprayed charged droplets are atomized due to the collision with the air, which causes the solvent in the droplets to vaporize. Through this process, ions originating from the sample component are generated. The various ions thus generated are drawn into the desolvation tube 7 with the air and other particles and are sent to the first intermediate vacuum chamber 3. A large portion of the ions introduced into the first intermediate vacuum chamber 3 are captured and converged by an RF electric field created by the voltages applied from the first ion guide voltage generator 13 to the first ion guide 20. The thin, converged stream of ions is sent through the ion passage hole 9 into the second intermediate vacuum chamber 4.

The ions introduced into the second intermediate vacuum chamber 4 are captured and converged by an RF electric field created by the voltages applied from the second ion guide voltage generator 14 to the second ion guide 10, to be sent into the analysis chamber 5. The various ions which have originated from the sample and thus entered the analysis chamber 5 are introduced into the inner space of the quadrupole mass filter 11. Among those various ions, only an ion having a specific mass-to-charge ratio (m/z) corresponding to the voltages applied from the mass filter voltage generator 15 to the quadrupole mass filter 11 is selectively allowed to pass through the quadrupole mass filter 11 and reach the ion detector 12.

The ion detector 12 generates and outputs an ion intensity signal corresponding to the amount of ions which have reached this detector. For example, the mass filter voltage generator 15 applies, to the quadrupole mass filter 11, voltages corresponding to the m/z value of an ion of a sample component which is the target of observation. This eliminates the influence of the ions originating from foreign substances contained in the sample, so that an intensity signal of an ion originating from a target component of the sample can be obtained.

[Details of Configuration and Operation of First Ion Guide 20]

In the previously described mass spectrometer, the first ion guide 20 is configured to guide, to the ion passage hole 9, ions which have been sent into the first intermediate vacuum chamber 3 through the desolvation tube 7. A detailed description of the configuration and operation of this first ion guide 20 is hereinafter given.

Figure 2:
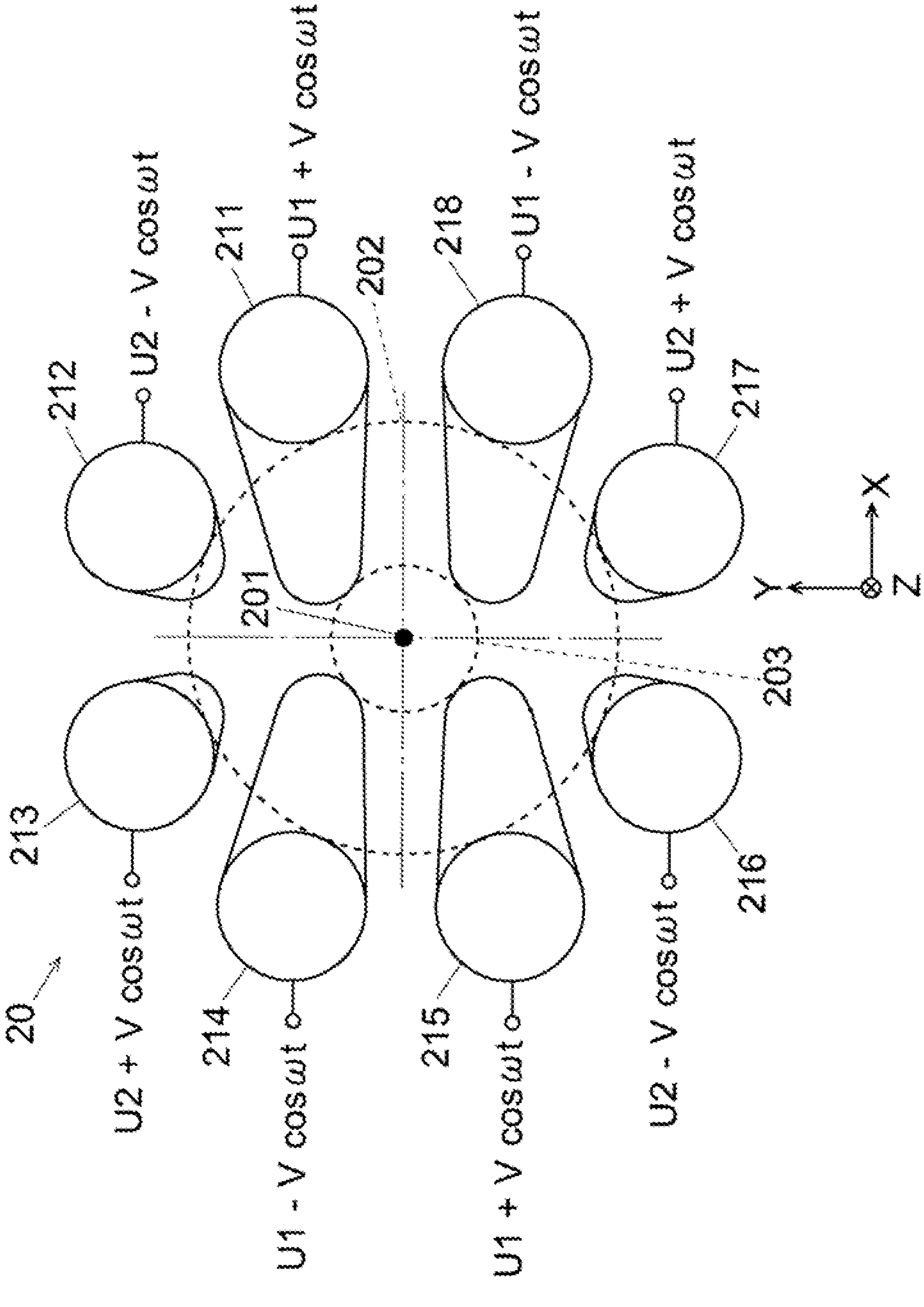
FIG. 2 is a plan view of a first ion guide in the mass spectrometer according to the present embodiment, viewed from the ion incidence side.
Figure 3:
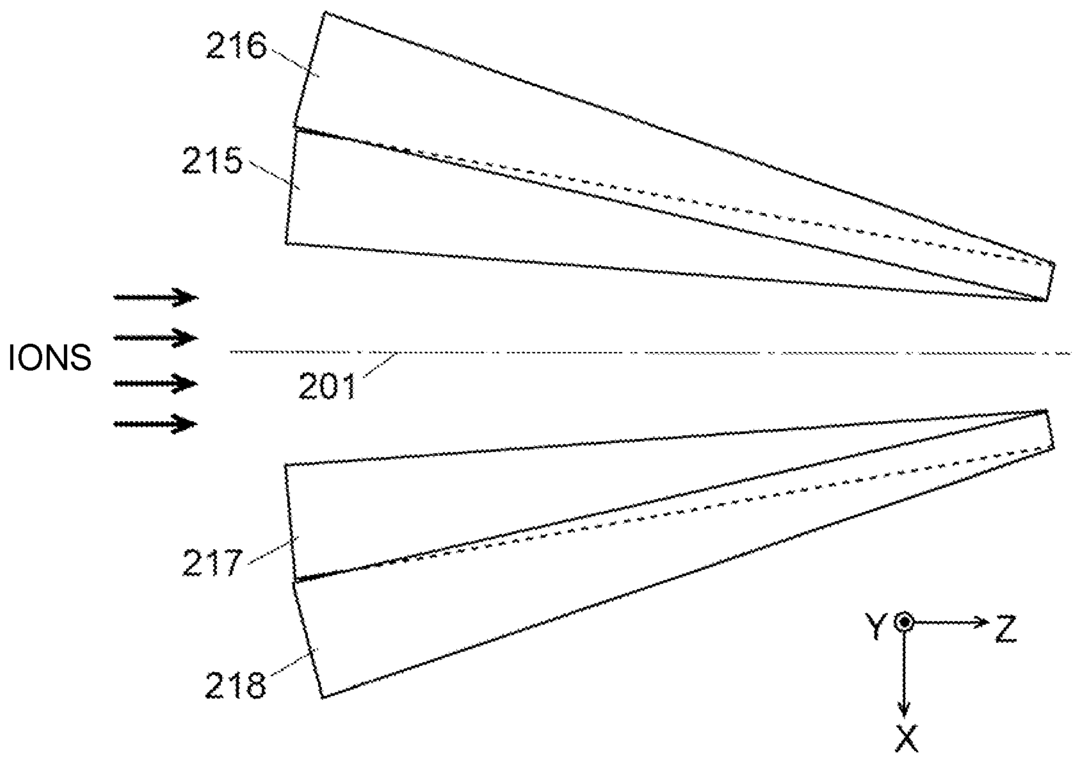
FIG. 3 is a plan view of the first ion guide in the mass spectrometer according to the present embodiment, viewed in the negative direction of the Y axis from the X-Z plane containing the ion beam axis.

FIG. 2 is a plan view of the first ion guide 20 viewed from the ion incidence side (which is the left side in FIG. 1). FIG. 3 is a plan view of the first ion guide 20 viewed in the negative direction of the Y axis from the X-Z plane containing the ion beam axis 201.

The ion guide 20 includes eight rod electrodes 211-218 each of which has an elongated, substantially columnar shape. One rod electrode 21 (it should be noted that reference sign "21" is used to indicate one of the eight rod electrodes without specifying which one is meant, while reference sings "211-218" are used to indicate one specific rod electrode) is shaped like a truncated cone whose diameter is largest at the ion-entrance end and gradually decreases in the Z-axis direction, being smallest at the ion-exit end. The eight rod electrodes 211-218 in the present example are roughly identical in shape, although this is not essential in the present invention, as will be described later.

As shown in FIGS. 2 and 3, at the ion-entrance end, the eight rod electrodes 211-218 are arranged so as to be externally tangent to a circle 202 centered on the ion beam axis 201, surrounding the circle 202 at substantially regular intervals of angle (45 degrees). On the other hand, at the ion-exit end, four rod electrodes 211, 214, 215 and 218 among the eight rod electrodes 211-218 are tangent to a circle 203, which is centered on the ion beam axis 201 and has a smaller diameter than the circle 202, and are arranged at substantially regular intervals of angle (90 degrees) around the circle 203. That is to say, the four rod electrodes 211, 214, 215 and 218 are not parallel to the Z axis, i.e., the ion beam axis 201; they are arranged in an inclined form so as to obliquely extend with respect to the axis.

On the other hand, the other four rod electrodes 212, 213, 216 and 217 among the eight rod electrodes 211-218 are either substantially parallel to the Z axis, or non-parallel to the Z axis and arranged in an inclined form so as to obliquely extend with respect to the Z axis, i.e., the ion optical axis 201, at a smaller angle than the four aforementioned rod electrodes 211, 214, 215 and 218.

Due to the previously described arrangement of the eight rod electrodes 211-218, these rod electrodes 211-218 form an octopole arrangement at the ion-entrance end as well as a quadrupole arrangement at the ion-exit end. Since the inscribed circle 203 of the quadrupole-arrangement section of the rod electrodes 211, 214, 215 and 218 at the ion-exit end has a smaller diameter than the inscribed circle 202 of the octopole-arrangement section of the rod electrodes 211-218 at the ion-entrance end, the space surrounded by the rod electrodes 211-218, or in other words, the space within which ions are to be confined by the RF electric field gradually narrows in the travelling direction of the ions.

The voltages applied from the first ion guide voltage generator 13 to the rod electrodes 211-218 are as shown in FIG. 2; each pair of rod electrodes neighboring each other around the ion beam axis 201 are respectively supplied with RF voltages $+V\cos\omega t$ and $-V\cos\omega t$ having the same amplitude and opposite phases. In addition to these RF voltages, a direct voltage U1 for efficiently transporting ions within the inner space of the first ion guide 20 is applied to the four rod electrodes 211, 214, 215 and 218 which form the quadrupole arrangement at the ion-exit end. On the other hand, the other four rod electrodes 212, 213, 216 and 217 which are not included in the quadrupole arrangement are supplied with a direct voltage U2 which is higher than the direct voltage U1 when the polarity of the ion to be analyzed is positive, or a direct voltage U2 which is lower than the direct voltage U1 when the polarity of the ion to be analyzed is negative.

In normal cases, the direct voltages U1 applied to the four rod electrodes 211, 214, 215 and 218 are equal to each other.

However, these voltages do not need to be completely equal to each other. The same also applies to the direct voltages U2.

The previously described RF voltages create an octopole RF electric field having a strong ion-confining effect within the ion incidence area of the first ion guide 20. Since the rod electrodes 211-218 have a large diameter within this area, a strong octopole RF electric field occurs despite the fact that the diameter of the circle 202, i.e., the area of the ion-receiving opening is large. When the opening diameter of the desolvation tube 7 is increased in order to increase the amount of ions to be sent from the ionization chamber 2 to the first intermediate vacuum chamber 3, the spread of the ion stream released from the exit end of the desolvation tube 7 into the first intermediate vacuum chamber 3 also increases. Even in such a situation, the first ion guide 20 can efficiently collect the spread ions by the strong octopole RF electric field and take them into its inner space.

The ions taken into the ion guide are captured by the RF electric field and forced into the space surrounded by the four rod electrodes 211, 214, 215 and 218 due to the effect of the direct electric field mainly created by the direct voltages applied to the other four rod electrodes 212, 213, 216 and 217. That is to say, the direct electric field created by the direct voltages applied to the rod electrodes 21 has the function of preventing the dissipation of the ions. As the ions travel forward, the ion-confining space becomes narrower. As they come closer to the exit, the ions are converged into an area near the ion beam axis 201 by the quadrupole RF electric field created within the space surrounded by the four rod electrodes 211, 214, 215 and 218. The thin stream of ions thus formed is released from the first ion guide 20 and enters the second intermediate vacuum chamber 4 through the ion passage hole 9.

Thus, the first ion guide 20 can transfer ions sent from the previous stage to the subsequent stage while suppressing the loss of the ions. It can achieve a high level of ion transport efficiency by working together with the previous and next members (desolvation tube 7 and skimmer 8).

Figure 4:
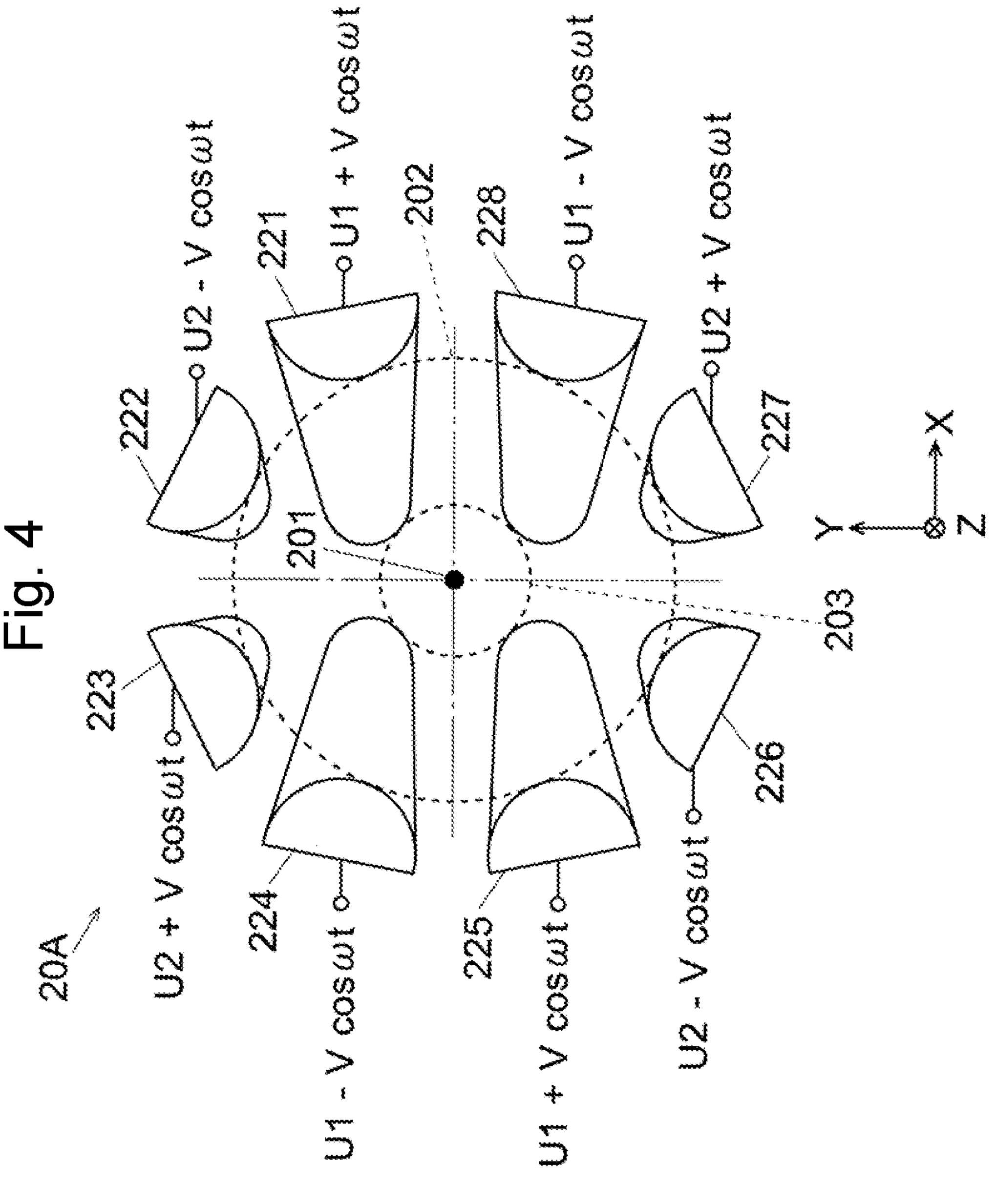
FIG. 4 is a plan view of a modified example of the first ion guide viewed from the ion incidence side.

In the example of FIG. 2, each rod electrode 21 has a substantially circular cross section. Actually, having a substantially arc-shaped cross section in the portion directed to the ion beam axis 201 is sufficient for creating the RF and direct electric fields within the space surrounded by the rod electrodes 21; the cross-sectional shape of the portion directed outward is not essential. Accordingly, the cross-sectional shape of the rod electrodes may be changed to an appropriate shape, such as a substantially semicircular shape as shown in FIG. 4.

Modified Example of Arrangement and Size of Rod Electrodes

As described earlier, in the first ion guide 20, the radius of the inscribed circle 203 of the four rod electrodes 211, 214, 215 and 218 at the ion-exit end is smaller than that of the inscribed circle 202 of the eight rod electrodes 21 at the ion-entrance end. The radius of the rod electrodes 21 at the ion-exit end is smaller than at the ion-entrance end. Each of these sizes affects the ion intensity. Accordingly, the present inventors have prepared two experimental ion guides "A" and "B" which differ from each other in the sizes related to the rod electrodes and their arrangement and has experimentally studied how much the ion intensity increases as compared to the case of a conventional pole-number conversion ion guide whose rod electrodes have a uniform radius from the ion-entrance end to the exit end.

The ion guides A and B are identical to each other in the diameter A1 of the inscribed circle in the octopole-arrangement section at the ion-entrance end as well as in the radius B1 of the rod electrodes at the ion-entrance end. On the other hand, the ratio of the diameter A1 of the inscribed circle in the octopole-arrangement section at the ion-entrance end to the diameter A2 of the inscribed circle in the quadrupole-arrangement section at the ion-exit end ("inscribed-circle ratio"), A1/A2, is 5 in the ion guide A and 4.44 in the ion guide B. The ratio of the radius B1 of the rod electrodes 21 at the ion-entrance end to the radius B2 at the ion-exit end ("electrode-radius ratio"), B1/B2, is 2.25 in the ion guide A and 1.91 in the ion guide B. In other words, as compared to the ion guide B, the ion guide A shows a more rapid narrowing of the ion-confining space in the travelling direction of the ions, accompanied by a corresponding rapid decrease in the radius of the rod electrodes.

Figure 5:
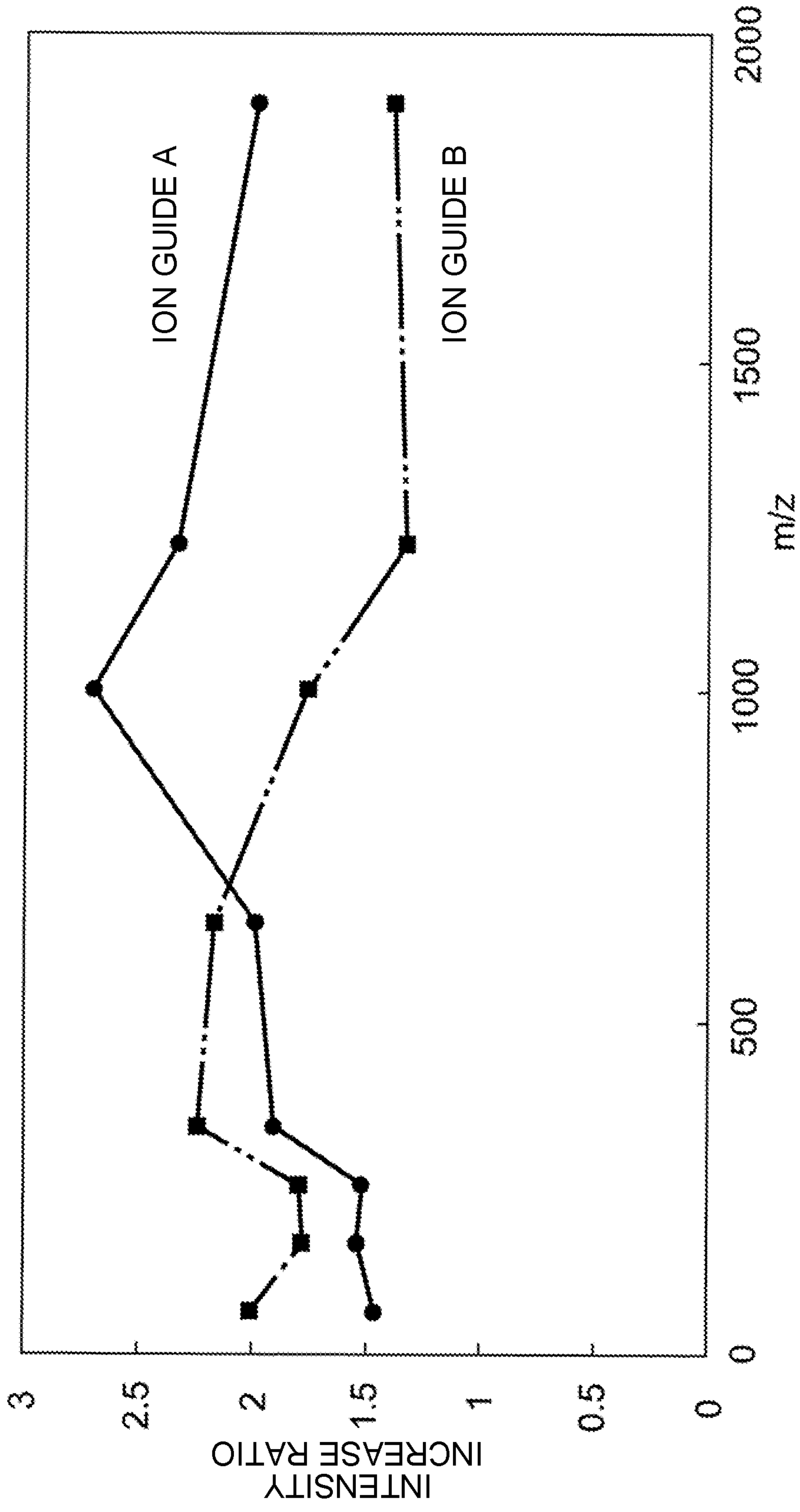
FIG. 5 is a measurement example showing the effect of increasing the ion intensity by a pole-number conversion ion guide according to one example of the present invention as compared to a conventional pole-number conversion ion guide.

FIG. 5 shows a measured result of the relationship between the m/z of the ion and the ratio of the increase of the ion intensity by the ion guides A and B as compared to the conventional pole-number conversion ion guide.

FIG. 5 demonstrates that the ion guide B has a higher effect in increasing the ion intensity within a low m/z range, while the ion guide A has a higher effect in increasing the ion intensity within an m/z range equal to or larger than around m/z 700, and the difference is noticeable. It can also be confirmed that both ion guides A and B have an evidently higher effect in increasing the ion intensity as compared to the conventional pole-number conversion ion guide.

Under the condition that the diameter of the inscribed circle at the ion-exit end is the same, increasing the inscribed-circle ratio results in a larger interval of space between the rod electrodes neighboring each other in the circumferential direction at the ion-entrance end. This means that the RF electric field is weakened. Therefore, in order to sufficiently collect ions, it is necessary to increase the radius of the rod electrodes at the ion-entrance end according to the widening of the interval of the rod electrodes. In other words, the electrode-radius ratio must be increased. Therefore, it is possible to consider that the inscribed-circle ratio divided by the electrode-radius ratio must be within a certain range in order to efficiently collect ions which are travelling while gradually spreading. For example, the inscribed-circle ratio divided by the electrode-radius ratio is 5/2.25=2.22 for the ion guide A and 4.44/1.91=2.32 for the ion guide B. From this result, it is possible to estimate that a preferable range of the inscribed-circle ratio divided by the electrode-radius ratio may be roughly from 2 to 2.5, although these numerical values are not fixed definitely.

Overall Configuration of Mass Spectrometer According to Modified Example

In the mass spectrometer according to the previously described embodiment, the central axis at the exit end of the desolvation tube 7 is aligned with that of the ion passage hole 9. As opposed to this design, an "off-axis" configuration may be adopted, as illustrated in Patent Literature 1, in which the central axis at the exit end of the desolvation tube 7 is not aligned with that of the ion passage hole 9. This configuration is aimed at removing, within the first intermediate vacuum chamber 3, unionized sample-component molecules and active neutral particles which are sent into the first intermediate vacuum chamber 3 together with the ions, thereby preventing those particles from being sent to the second intermediate vacuum chamber 4.

Figure 6:
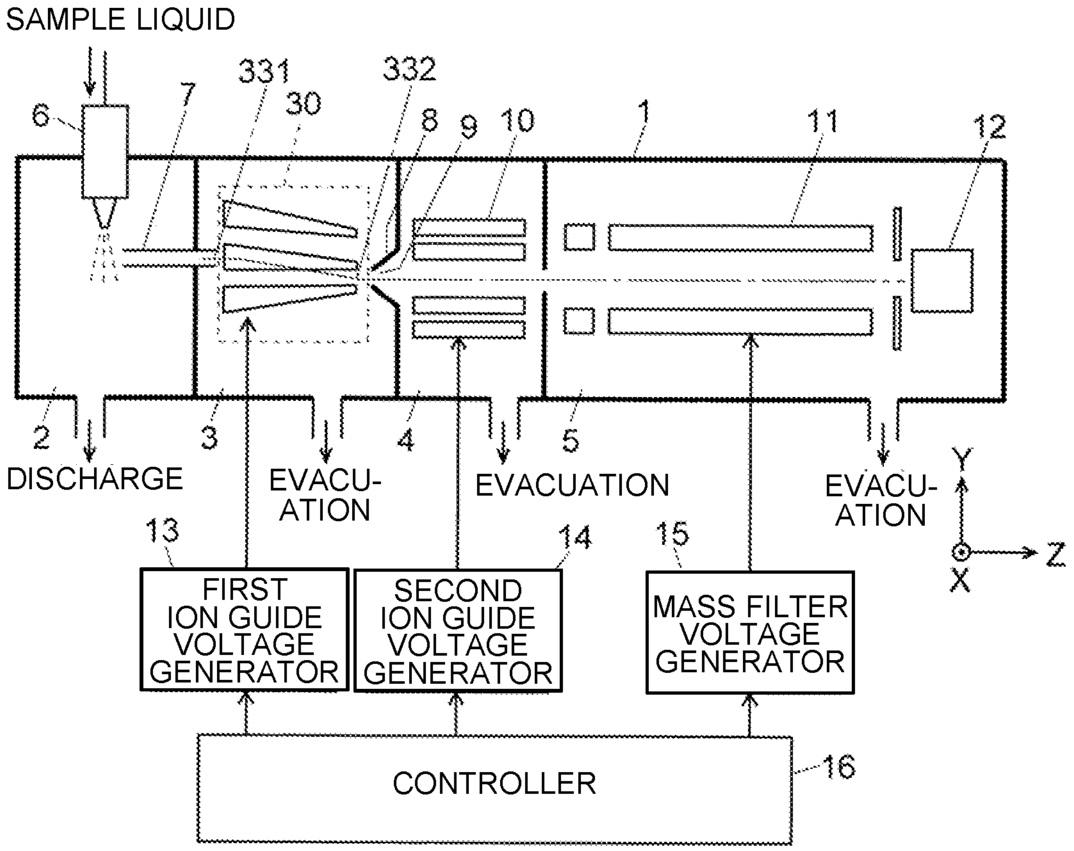
FIG. 6 is a schematic configuration diagram of a mass spectrometer as a modified example of the present invention.
Figure 7:
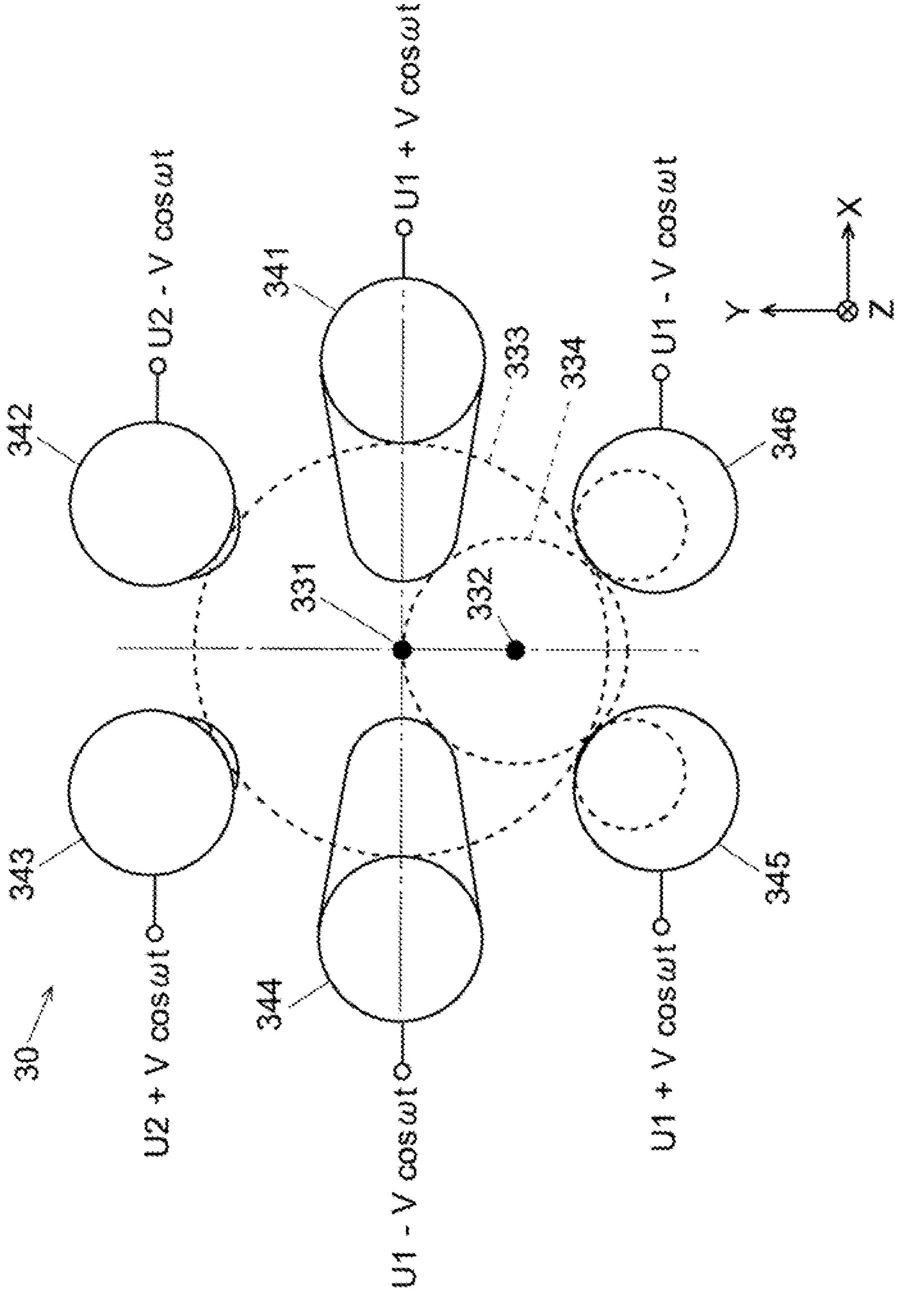
FIG. 7 is a plan view of the first ion guide in the mass spectrometer as the modified example, viewed from the ion incidence side.

FIG. 6 is a schematic configuration diagram of a mass spectrometer according to a modified example in which an off-axis configuration is adopted. Each component which has an identical or corresponding component in the mass spectrometer shown in FIG. 1 is denoted by the same reference sign, and detailed description of the component will be omitted. In the present example, the central axis 331 at the exit end of the desolvation tube 7 and the central axis 332 of the ion passage hole 9 are displaced from each other in the Y-axis direction. The first ion guide 30 has the function of collecting the incoming ions transferred through the desolvation tube 7 and shaping them into a thin beam, as well as the function of producing a lateral shift of the travelling ions in the Y-axis direction so as to guide them into the ion passage hole 9. FIG. 7 is a plan view of the first ion guide 30 viewed from the ion incidence side (the left side in FIG. 6).

The six rod electrodes 341-346 in the first ion guide 30 form a hexapole arrangement at the ion-entrance end and a quadrupole arrangement at the ion-exit end. At the ion-entrance end, the six rod electrodes 341-346 are externally tangent to a circle 333. Among those six rod electrodes 341-346, four rod electrodes 341, 344, 345 and 346 are externally tangent to a circle 334 at the ion-exit end. The central axis 331 of the hexapole arrangement and the central axis 332 of the quadrupole arrangement are parallel to each other yet are not aligned with each other.

The voltages applied from the first ion guide voltage generator 13 to the rod electrodes 34 are as shown in FIG. 7: Two RF voltages +Vcosωt and −Vcosωt having the same amplitude and opposite phases are respectively applied to any pair of rod electrodes neighboring each other around the central axis 331. Consequently, +Vcosωt and −Vcosωt are alternately applied in the circumferential direction around the central axis 331. In addition to these RF voltages, a direct voltage U1 for efficiently transporting ions within the first ion guide 30 is applied to the four rod electrodes 341, 344, 345 and 346. On the other hand, a direct voltage U2 is applied to the other two electrodes 342 and 343, where U2 is higher than U1 (larger than U1 on the positive side) when the polarity of the ion to be analyzed is positive, while U2 is lower than U1 (larger than U1 on the negative side) when the polarity of the ion to be analyzed is negative.

The RF voltage +Vcosωt or −Vcosωt applied to each rod electrode 34 creates a multipole RF electric field having the ion-confining effect within the space surrounded by the six rod electrodes 34. This multipole RF electric field is a hexapole RF electric field centered on the central axis 331 within the ion incidence area, while it is a quadrupole RF electric field centered on the central axis 332 within the ion-exit area. The state of the electric field between the ion-entrance end and the ion-exit end gradually changes from the hexapole RF electric field to the quadrupole RF electric field.

On the other hand, due to the voltage difference between the direct voltages U1 and U2 applied to the six rod electrodes 34, a direct electric field is created which acts on the ions so as to push the ions, which are initially distributed around the central axis 331, toward the other central axis 332, or in other words, so as to deflect the path of the ions. In other words, one of the effects of the direct electric field created by the direct voltages applied to the six rod electrodes 34 is the effect of deflecting ions which are being transported.

The DC component of the potential on the central axis 331 within the incidence area of the space surrounded by the six rod electrodes 34 depends on both of the direct voltages U1 and U2, while the DC component of the potential on the central axis 332 within the ion-exit area mainly depends on only the direct voltage U1. In the case where the polarity of the ion to be analyzed is positive, since the direct voltage U2 is higher than U1, the DC component of the potential on the central axis 331 within the incidence area where the influence of the direct voltage U2 is more noticeable becomes higher than the DC component of the potential on the central axis 332 within the ion-exit area. Therefore, the potential distribution on the beam axis of the ions transported through the space surrounded by the six rod electrodes 34 roughly forms a downward slope from the entrance end toward the exit end. In other words, this is an acceleration electric field which accelerates positive ions, and therefore, the ions which have entered the aforementioned space receive kinetic energy which forces them toward the exit end. Thus, another effect of the direct electric field created by the direct voltages applied to the six rod electrodes 34 is the effect of accelerating ions which are being transported.

Consequently, the ions which have entered the space surrounded by the six rod electrodes 34 in a roughly Z-axis direction are collected by the hexapole RF electric field, and the entire group of ions are gradually deflected toward the rod electrodes 345 and 346 as they travel forward in the Z-axis direction. Since kinetic energy is imparted to the travelling ions, those ions can smoothly travel toward the exit, without stagnating even when they slightly lose their energy due to their contact with the residual gas (or the like) in the middle of their travel. As the ions come close to the exit of the first ion guide 30, the ions become captured by the quadrupole RF electric field formed by the four rod electrodes 341, 344, 345 and 346 which are in the quadrupole arrangement. The captured ions are converged into an area around the central axis 332 and ejected from the exit in the form of a thin stream of ions. Meanwhile, even when there are unionized sample molecules, active neutral particles or other types of neutral particles entering the ion guide along with the ions, those neutral particles cannot be deflected, and therefore, are unlikely to reach the ion passage hole 9. Thus, the present mass spectrometer can efficiently transport ions to the subsequent stage while removing neutral particles in the middle of their travel.

[Other Modifications]

The first ion guide 20 in the previously described embodiment includes eight rod electrodes, forming an octopole arrangement at the ion-entrance end, while the ion guide 30 in the previously described modified example includes six rod electrodes, forming an hexapole arrangement at the ion-entrance end. The number of rod electrodes in an ion guide to be used in the present invention is not limited to those numbers; it may be any even number equal to or larger than six. In general, increasing the number of rod electrodes means a higher level of ion-confining capability within the ion incidence area. However, only an insignificant amount of improvement in the confining capability can be achieved after the number of rod electrodes has been increased to a certain number. Additionally, increasing the number of rod electrodes makes the ion guide more complex in configuration and lowers the ease of assembly and maintenance. With these factors taken into account, the number of rod electrodes should practically be six, eight, ten or twelve.

In the previously described example, the direct voltage U2 applied to the rod electrodes is higher than the direct voltage U1. When there is no need to deflect ions in the middle of their transport, the direct voltage U2 does not need to be higher than the direct voltage U1 (in the case where the ions are positive). Provided that the ion to be analyzed is a positive ion, when the direct voltage U2 is lower than the direct voltage U1, the DC component of the potential on the central axis within an entrance area of the ion guide is lower than the DC component of the potential on the central axis within an exit area, as is evident from the previous descriptions. To put it another way, the potential distribution on the optical axis of the ions transported through the space surrounded by the rod electrodes roughly forms an upward slope from the entrance toward the exit. This is a deceleration electric field which decelerates positive ions, and therefore, the ions which have entered the aforementioned space are gradually deprived of kinetic energy as they travel toward the exit end. In other words, the effect of the direct electric field created by the direct voltages applied to the rod electrodes is the effect of decelerating ions which are being transported.

For example, in the configuration of the mass spectrometer shown in FIG. 1, when the air stream which flows from the ionization chamber 2 into the first intermediate vacuum chamber 3 has a considerably high speed due to the pressure difference between the two ends of the desolvation tube 7, opening diameter of the desolvation tube 7 and/or other factors, the ions introduced into the first intermediate vacuum chamber 3 may initially have an excessively high level of kinetic energy, making it difficult to capture them by the RF electric field. In that case, a deceleration electric field may be created within the inner space of the ion guide, in place of the acceleration electric field directed toward the exit end, so as to actively reduce the kinetic energy of the ions by the effect of the deceleration electric field. This allows the ions to be satisfactorily captured by the RF electric field and directed to the exit while being converged.

Thus, the relationship between the direct voltages U1 and U2 in terms of their magnitude can be appropriately changed depending on how the behavior of the ions entering the ion guide should be controlled.

In the previous description of the embodiment and its modified examples, the polarity of the ion to be analyzed is assumed to be positive. It is evidently possible to deal with the case where the polarity of the ion to be analyzed is negative by appropriately changing the direct voltage applied to each rod electrode included in the ion guide as well as those applied to other related sections.

In the mass spectrometer according to the previously described embodiment, the first ion guide 20 or 30 is located within the first intermediate vacuum chamber 3. It is also possible to place the first ion guide 20 or 30 within the second intermediate vacuum chamber 4 in which the gas pressure is lower than in the first intermediate vacuum chamber 4 yet is higher than the gas pressure in the analysis chamber 5.

The first ion guide 20 or 30 may also be located within an intermediate vacuum chamber in a mass spectrometer in which ions are generated under atmospheric pressure or a pressure close to that level and are transported through one or more intermediate vacuum chambers to a mass separator located in a high-vacuum ambience, as in a triple quadrupole mass spectrometer, quadrupole time-of-flight mass spectrometer, Fourier transform ion cyclotron resonance mass spectrometer, or other types of mass spectrometers which are not a single quadrupole mass spectrometer. The ion source is not limited to an ESI ion source; it may be replaced by ion sources employing various ionization techniques, such as an atmospheric pressure chemical ionization (APCI), atmospheric photoionization (APPI), probe electrospray ionization (PESI), or direct analysis in real time (DART). In summary, the ion source and the mass separator are not limited to the previously described examples; various other types or systems are available.

The first ion guide 20 or 30 does not always need to be located within an intermediate vacuum chamber; it is also possible to place the first ion guide 20 or 30 within a cell into which various kinds of gas, such as a collision gas or reaction gas, are introduced from an external source and used for various operations on ions.

Specifically, for example, a triple quadrupole mass spectrometer or quadrupole time-of-flight mass spectrometer includes a collision cell for dissociating ions by collision induced dissociation (CID). The first ion guide 20 or 30 may be located within this collision cell. An inductively coupled plasma (ICP) mass spectrometer normally includes a collision cell or reaction cell for removing interference ions or molecules. The first ion guide 20 or 30 may be located within this collision cell or reaction cell.

Furthermore, the previously described embodiment and modified examples are mere examples of the present invention and will naturally be included within the scope of claims of the present application even when an appropriate change, addition or modification is additionally made within the spirit of the present invention.

(Clause 1) One mode of the mass spectrometer according to the present invention is a mass spectrometer having an ion transport optical system configured to transport ions to be analyzed, where:

the ion transport optical system includes N rod electrodes arranged so as to extend in an ion transport direction as a whole, where N is an even number equal to or larger than six, as well as a voltage generator configured to apply a predetermined voltage to each of the N rod electrodes;

the N rod electrodes are in an N-pole arrangement at an ion-entrance end at which all of the N rod electrodes are externally tangent to a circle of diameter A1, while four of the N rod electrodes are in a quadrupole arrangement and are externally tangent to a circle of diameter A2 (where A2<A1) at an ion-exit end, with at least two rod electrodes among the four rod electrodes obliquely arranged with respect to the central axis of the N-pole or quadrupole arrangement so as to come closer to the central axis with a forward travel of the ions in the ion transport direction, and at least the four rod electrodes among the N rod electrodes have a shape in which the cross-sectional radius of an arc-shaped portion facing the central axis at the ion-exit end is smaller than the cross-sectional radius of an arc-shaped portion facing the central axis at the ion-entrance end; and the voltage generator is configured to apply, to each pair of rod electrodes neighboring each other around the central axis among the N rod electrodes, a pair of RF voltages whose phases are opposite to each other, as well as to apply a first direct voltage to the four rod electrodes and a second direct voltage, which is different from the first direct voltage, to N−4 rod electrodes other than the four rod electrodes among the N rod electrodes.

In the mass spectrometer according to Clause 1, the ion transport optical system can efficiently collect ions which are incident in a considerably spreading form in the ion incidence area, then gradually decrease the spatial spread of the ions while sending them toward the rear section along the ion beam axis, and ultimately shape the ions into a thin beam and eject them to the outside by the high ion-converging effect in the ion-exit area. Consequently, as compared to the conventional pole-number conversion ion guide, an even higher level of ion transport efficiency can be realized, so that the amount of ions to be subjected to a mass spectrometric analysis can be increased, and the analysis sensitivity can be improved. Furthermore, since the radius of the rod electrodes in the ion-exit area (or the cross-sectional radius of the arc-shaped portion facing the central axis) can be small as compared to the conventional pole-number conversion ion guide, interference of the rod electrodes neighboring each other in the circumferential direction is less likely to occur.

(Clause 2) In the mass spectrometer according to Clause 1, the ratio (A1/A2)/(D1/D2) may be within a range from 2 to 2.5, where D1/D2 is the ratio of a cross-sectional radius D1 of the arc-shaped portion of the N rod electrodes facing the central axis at the ion-entrance end, to a cross-sectional radius D2 of the arc-shaped of the portion of the N rod electrodes facing the central axis at the ion-exit end, and A1/A2 is the ratio of the dimeter A1 of the circle to which the N rod electrodes are externally tangent at the ion-entrance end, to the diameter A2 of the circle to which the N rod electrodes are externally tangent at the ion-exit end.

In the mass spectrometer according to Clause 2, the incident ions which gradually spread while travelling from the previous stage to the ion transport optical system can be satisfactorily collected in the ion incidence area of the ion transport optical system, and the ions can also be satisfactorily converged into an area near the central axis while being transported through the ion-confining space in the ion transport optical system. Consequently, a high level of ion transport efficiency can be realized.

(Clause 3) The mass spectrometer according to Clause 1 or 2 may include: an ionization chamber configured to ionize a sample component in an ambience of atmospheric pressure; a high-vacuum chamber which contains a mass separation section and is maintained at a high degree of vacuum; and one or more intermediate vacuum chambers located between the ionization chamber and the high-vacuum chamber, where the N rod electrodes are located within the intermediate vacuum chamber next to the ionization chamber.

(Clause 4) The mass spectrometer according to Clause 1 or 2 may include: an ionization chamber configured to ionize a sample component in an ambience of atmospheric pressure; a high-vacuum chamber which contains amass separation section and is maintained at a high degree of vacuum; and two or more intermediate vacuum chambers located between the ionization chamber and the high-vacuum chamber.

where the N rod electrodes are located within the second intermediate vacuum chamber from the ionization chamber.

Each of the mass spectrometers according to Clauses 3 and 4 typically has the configuration of a multi-stage differential pumping system. In these mass spectrometers, a large amount of ions can be introduced into the mass separation section, while the loss of the ions originating from the sample component generated in the ambience of atmospheric pressure is extremely reduced. Consequently, a high level of analysis sensitivity can be achieved.

(Clause 5) The mass spectrometer according to Clause 1 or 2 may include a cell between an ion source and a mass separation section, the cell configured to be used for performing an operation on an ion by introducing a predetermined gas into the cell and causing the ion to come in contact with the gas, where the N rod electrodes are located within the cell.

The "cell" in the present context may be a collision cell for dissociating an ion or reducing the amount of kinetic energy of an ion through contact with an inert gas, or a reaction cell for adding a specific substance to an ion through contact with a reactive gas. The mass spectrometer according to Clause 5 can satisfactorily collect ions to be subjected to the operation as well as extract a desired kind of ion by dissociating the ions or subjecting the ions to a reaction.

REFERENCE SIGNS LIST

1 . . . Chamber
2 . . . Ionization Chamber
3 . . . First Intermediate Vacuum Chamber
4 . . . Second Intermediate Vacuum Chamber
5 . . . Analysis Chamber
6 . . . ESI Probe
7 . . . Desolvation Tube
8 . . . Skimmer
9 . . . Ion Passage Hole
10 . . . Second Ion Guide
11 . . . Quadrupole Mass Filter
12 . . . Ion Detector
13 . . . First Ion Guide Voltage Generator
14 . . . Second Ion Guide Voltage Generator
15 . . . Mass Filter Voltage Generator
16 . . . Controller
20, 30 . . . First Ion Guide
201 . . . Ion Beam Axis
202, 333 . . . Inscribed Circle (at Ion-Entrance End)
203, 334 . . . Inscribed Circle (at Ion-Exit End)
21, 211-218, 34, 341-346 . . . Rod Electrode
331, 332 . . . Central Axis

The invention claimed is:

1. A mass spectrometer having an ion transport optical system configured to transport ions to be analyzed, wherein:

the ion transport optical system includes N rod electrodes arranged so as to extend in an ion transport direction as a whole, where Nis an even number equal to or larger than six, as well as a voltage generator configured to apply a predetermined voltage to each of the N rod electrodes;

the N rod electrodes are in an N-pole arrangement at an ion-entrance end at which all of the N rod electrodes are externally tangent to a circle of diameter A1, while four of the N rod electrodes are in a quadrupole arrangement and are externally tangent to a circle of diameter A2 (where A2<A1) at an ion-exit end, with at least two rod electrodes among the four rod electrodes obliquely arranged with respect to a central axis of the N-pole or quadrupole arrangement so as to come closer to the central axis with a forward travel of the ions in the ion transport direction, each of the four rod electrodes among the N rod electrodes have an arc-shaped portion facing the central axis, and a cross-sectional radius of the arc-shaped portion at the ion-exit end is smaller than a cross-sectional radius of the arc-shaped portion at the ion-entrance end;

the voltage generator is configured to apply, to each pair of rod electrodes neighboring each other around the central axis among the N rod electrodes, a pair of RF voltages whose phases are opposite to each other, as well as to apply a first direct voltage to the four rod electrodes and a second direct voltage, which is different from the first direct voltage, to N−4 rod electrodes other than the four rod electrodes among the N rod electrodes; and a ratio (A1/A2)/(D1/D2) is within a range from 2 to 2.5, where D1/D2 is a ratio of a cross-sectional radius D1 of the arc-shaped portion of the N rod electrodes facing the central axis at the ion-entrance end, to a cross-sectional radius D2 of the arc-shaped of the portion of the N rod electrodes facing the central axis at the ion-exit end, and A1/A2 is a ratio of the diameter A1 of the circle to which the N rod electrodes are externally tangent at the ion-entrance end, to the diameter A2 of the circle to which the N rod electrodes are externally tangent at the ion-exit end.

2. The mass spectrometer according to claim 1, further comprising an ionization chamber configured to ionize a sample component in an ambience of atmospheric pressure; a high-vacuum chamber which contains a mass separation section and is maintained at a high degree of vacuum; and one or more intermediate vacuum chambers located between the ionization chamber and the high-vacuum chamber, wherein the N rod electrodes are located within the intermediate vacuum chamber next to the ionization chamber.

3. The mass spectrometer according to claim 1, further comprising an ionization chamber configured to ionize a sample component in an ambience of atmospheric pressure; a high-vacuum chamber which contains a mass separation section and is maintained at a high degree of vacuum; and two or more intermediate vacuum chambers located between the ionization chamber and the high-vacuum chamber, where the N rod electrodes are located within the second intermediate vacuum chamber from the ionization chamber.

4. The mass spectrometer according to claim 1, further comprising a cell between an ion source and a mass separation section, the cell configured to be used for performing an operation on an ion by introducing a predetermined gas into the cell and causing the ion to come in contact with the gas, where the N rod electrodes are located within the cell.

* * * * *